(12) United States Patent
Brand et al.

(10) Patent No.: US 8,707,029 B2
(45) Date of Patent: Apr. 22, 2014

(54) MOBILE HANDSET IDENTIFICATION AND COMMUNICATION AUTHENTICATION

(75) Inventors: Christiaan Johannes Petrus Brand, Stellenbosch (ZA); Albertus Stefanus Van Tonder, Stellenbosch (ZA); Daniel Jacobus Mueller, Stellenbosch (ZA)

(73) Assignee: Entersect International Limited, Ebene (MU)

( * ) Notice: Subject to any disclaimer, the term of this patent is extended or adjusted under 35 U.S.C. 154(b) by 0 days.

(21) Appl. No.: 13/813,034

(22) PCT Filed: Sep. 30, 2011

(86) PCT No.: PCT/IB2011/002305
§ 371 (c)(1),
(2), (4) Date: Jan. 29, 2013

(87) PCT Pub. No.: WO2012/042367
PCT Pub. Date: Apr. 5, 2012

(65) Prior Publication Data
US 2013/0132717 A1    May 23, 2013

(30) Foreign Application Priority Data

Sep. 30, 2010  (ZA) ................................ 2010/06995
Jan. 7, 2011    (ZA) ................................ 2011/00198

(51) Int. Cl.
*H04L 29/06*      (2006.01)

(52) U.S. Cl.
USPC .............................. 713/156; 713/175; 726/10

(58) Field of Classification Search
None
See application file for complete search history.

(56) References Cited

U.S. PATENT DOCUMENTS

| | | | | |
|---|---|---|---|---|
| 6,161,180 | A   * | 12/2000 | Matyas et al. | ................ 713/169 |
| 6,243,812 | B1 * | 6/2001  | Matyas et al. | ................ 713/172 |
| 6,505,301 | B1 * | 1/2003  | Matyas et al. | ................ 713/169 |
| 6,505,302 | B1 * | 1/2003  | Matyas et al. | ................ 713/169 |
| 7,742,605 | B2 * | 6/2010  | Hornak | ........................ 380/277 |
| 2004/0103283 | A1 | 5/2004 | Hornak | |
| 2010/0306546 | A1* | 12/2010 | Willey et al. | ................... 713/175 |
| 2011/0113238 | A1* | 5/2011  | Jennings et al. | .............. 713/156 |
| 2012/0300924 | A1* | 11/2012 | Qu et al. | ......................... 380/44 |

\* cited by examiner

*Primary Examiner* — Michael R Vaughan
(74) *Attorney, Agent, or Firm* — The Webb Law Firm

(57) ABSTRACT

Disclosed is a system and method for authenticating a communications channel between a mobile handset associated with a user and an application server, for uniquely identifying the mobile handset and for encrypting communications between the mobile handset and the application server over the communication channel is provided. The system includes a certificate authority configured to issue digital certificates to the handset and the application server, as well as software applications operating on both the handset and application server. The digital certificates may be used by the handset and application server to uniquely identify one another as well as to exchange encryption keys by means of which further communication between them may be encrypted.

13 Claims, 2 Drawing Sheets

MOBILE HANDSET IDENTIFICATION AND COMMUNICATION AUTHENTICATION

FIELD OF THE INVENTION

This invention relates to mobile handset identification and the authentication and securing of communication channels between mobile handsets and application servers. In particular, the invention relates to a system and method for authenticating and securing online communication channels between mobile handsets and online application servers in a way that allows the application server to validate the identity of the mobile handset and vice versa.

BACKGROUND TO THE INVENTION

In modern-day business, an increasing number of transactions are conducted electronically through online application servers, by means of communication over networks such as, most commonly, the Internet. While traditionally conducted from personal computers and other devices which typically have considerable processing power, transactions are increasingly being conducted from Internet enabled mobile phones and other mobile handheld devices that do not necessarily have the same processing capabilities.

In the remainder of this specification the term "mobile handset" should be interpreted to include any mobile communications device capable of communicating over a communications network, such as a cellular network, and having at least a limited amount of processing power. The term should be interpreted to specifically include all mobile or cellular phones but may also include portable computers such as laptops, handheld personal computers and the like.

A problem with conventional online transactions is, however, the inherent security risk associated with online communication. Unscrupulous operators are constantly developing new techniques to intercept user and transactional information and to use these for defrauding the parties involved. Examples of such security threats include identity theft, Man-In-The-Middle (MITM) attacks, Pharming, Phishing, Over-The-Air SMS/data sniffing, third party infrastructure hijacking, Trojans, key loggers as well as various combinations of these threats.

In an attempt to make online transactions more secure, numerous security techniques have been developed. One such technique, an example of what is known as two factor authentication, utilizes the user's mobile phone as a device decoupled from the transaction to provide an additional layer of security. Because a one-to-one relationship is assumed to exist between a user and his or her mobile phone, for this technology to be used, it is assumed that the phone is always in the user's possession. Short Message Service (SMS) messages are currently the preferred delivery mechanism for security messages and generally take the form of a text message sent by the service provider (for example a banking institution) to the user's mobile phone. The message typically includes a single, unique one-time-pin (OTP) which the user then has to manually enter into the secure environment it wishes to access or prior to conducting a secure transaction, in conjunction with his or her normal login details.

While this technology adds an extra layer of security, it is still susceptible to abuse as it is possible to intercept SMS messages through, for example, techniques such as SIM-card cloning. It also still requires the user to enter an 8-digit (or longer) code from the cell phone onto the website or otherwise of the secure transaction it wishes to perform. Another disadvantage of this technology is the relatively high cost involved for the institution hosting the secure transaction, as it has to send an SMS message through a GSM network provider each time a user needs to be authenticated. Authentication may take place a number of times during any particular session and each such message will normally be billed for individually by the GSM network provider.

In essence, this type of two-factor authentication is not completely "out-of-band" in the true sense of the word. While the OTP may arrive on the user's phone "out-of-band", the user again has to enter it into and transmit it over the same communications band, thus making it susceptible to interception once more. If the browser or other communication channel being used has been compromised, the transmission of the OTP will likewise have been compromised.

Another major disadvantage of this technology has only become apparent since mobile handsets are increasingly being used as devices for browsing the Internet and for transacting online. A large number of mobile handsets do not allow users to have multiple applications running at the same time. As a result, the user cannot receive an SMS with an OTP while he or she is browsing the Internet on the handset through a web browser application. This necessitate the user to close the browser before reading the SMS and OTP, only to then have to re-launch the browser in order to enter the OTP in the site. Even in cases where it is possible to have multiple active applications at a given time, the switching between applications can be difficult and awkward.

In addition to what has been said above, most security protocols that have been developed require a substantial amount of processing power in order to be viable. One of the most common security measures used in online transaction today is Transport Layer Security (TLS) or its predecessor, Secure Socket Layer (SSL). TLS and SSL are both what is known as cryptographic protocols and are used to encrypt segments of network connections at the application layer to ensure secure end-to-end transit at the transport layer. SSL is, however, problematic for mobile handsets for a variety of reasons, one of which is the fact that handsets generally do not have the processing power to calculate their own private and public cryptographic key pairs that can be used for secure communication. Apart from it potentially being impossible for mobile handsets to request certificates in some cases, the process will in other cases still be complex and tedious. In addition, most mobile handsets simply do not have enough Root Certificates pre-installed on them to enable them to accept any normal sub-set of certificates issued by conventional Certificate Authorities (CAs).

As a result of the above limitations and difficulties with mobile handsets, operators of online application servers, for example banks, typically choose to avoid the complications by drastically limiting the number and extent of online transactions that can be conducted from a user's mobile handset. This greatly inhibits the use of technology as users still have to have access to personal computers in order to use the full host of services offered by most online application servers.

SUMMARY OF THE INVENTION

In accordance with this invention there is provided a system for authenticating a communications channel between a mobile handset associated with a user and an application server, for uniquely identifying the mobile handset and for encrypting communications between the user and the application server over the communication channel, the system including a certificate authority, a user side software application installed on the mobile handset, and a server side software application installed on the application server, the system being characterized in that the user side software application utilizes a user side encryption module provided by the certificate authority and is configured to request, preferably automatically, a digital user certificate from the certificate authority whenever the user side encryption module established that the mobile handset does not have a valid user certificate, for example, when the mobile handset attempts to transact with the application server for the first time; the certificate authority is adapted to create and issue the user certificate to the mobile handset upon receiving the request, the user certificate including at least one identifier which is uniquely associated with the mobile handset;

the server side software application utilizes a server side encryption module provided by the certificate authority and is configured to request and receive the user certificate from the mobile handset, to validate it as originating from the certificate authority using the server side encryption module, to uniquely identify the mobile handset from the identifier in the user certificate, and to transmit a digital server certificate issued to it by the certificate authority to the mobile handset where it is received by the user side software application and validated as originating from the certificate authority using the user side encryption module; and in that upon successful validation of the user certificate by the server side software application and of the server certificate by the user side software application, the user side software application and the server side software application are further configured to share encryption keys utilizing their respective certificates, more specifically public and private key pairs associated with the respective certificates, to provide encryption, the encryption keys being useful for further data encryption between the mobile handset and the application server.

Further features of the invention provide for the digital user certificate and the digital server certificate to be X.509 certificates; for the identifier to be a unique digital key issued and assigned to the mobile handset by the certificate authority; for the server certificate to include a server identifier uniquely associated with the application server and by means of which the mobile handset may uniquely identify the application server; and for the user and server certificates to include a certificate authority signature generated with a certificate authority private key, a corresponding certificate authority public key by means of which the signature may be verified being known to both the user side and server side encryption modules and/or software applications.

Further features of the invention provide for the user side and server side encryption modules to be an integrated module provided by the certificate authority which contains both user and server functionality; and for the user and server side encryption module to be compiled into the user side and server side software applications, respectively, thereby providing additional encryption functionality.

Still further features of the invention provide for certificate authority to be further configured to, when issuing the mobile handset with the user certificate, calculate a user private and public key pair on behalf of the mobile handset; to secure a communications channel between the certificate authority and the mobile handset by means of a Diffie-Hellman key exchange or a similar protocol; to transmit the user private key to the mobile handset if the Diffie-Hellman key exchange was successful; and to include the user public key in the user certificate; alternatively, for the user side software application or encryption module to be further configured to instruct the mobile handset to calculate the user private and public cryptographic key pair itself.

Yet further features of the invention provide for the server side software application or encryption module to be configured to instruct the application server to calculate a server private and public key pair; alternatively for the certificate authority to calculate it on its behalf; for the application server public key to be included in the server certificate; for the user side and server side software applications or encryption modules to be configured to share the encryption keys by asymmetrically encrypting their communications with their respective public and private key pairs; and for the encryption keys to be symmetric encryption keys.

A further feature of the invention provides for the user side software application or encryption module to be further configured to instruct the mobile handset to store the received user certificate and user private and public key pair in a secure, preferably encrypted, location in a mobile handset memory from where it may only be retrieved by authorized applications, preferably only the user side software application and/or encryption module.

Still further features of the invention provide for the certificate authority to automatically periodically issue a new certificate to the mobile handset and/or the application server; for the new user certificate to include a new user private and public key pair; and for the new certificates to be issued annually.

A yet further feature of the invention provides for the user side software application or encryption module, as the case may be, to validate that it is indeed communicating with the certificate authority when requesting the user certificate, the validation being done by the user side software application or encryption module validating a certificate authority digital certificate against a certificate authority digital certificate that is distributed as part of the user side software application or encryption module, as the case may be, alternatively, for the validation to be done by the user side software application or encryption module simply encrypting communication with the certificate authority with the certificate authority public key, the validation being successful if the certificate authority is capable of decrypting the communication using the certificate authority private key.

The invention further provides a method for authenticating a communications channel between a mobile handset associated with a user and an application server, for uniquely identifying the mobile handset, and for encrypting communications between the mobile handset and the application server over the communication channel, the method being exercised at the application server and including the steps of receiving a digital user certificate from the mobile handset by means of a server side software application installed on the application server and validating the certificate by utilizing functionality provided by an encryption module distributed by a certificate authority, the digital user certificate having been issued to the mobile handset by the certificate authority and including at least one identifier uniquely associated with the mobile handset;

transmitting a digital server certificate from the application server to the mobile handset for validation of the application server, validation of the application server being conducted by means of a user side software application installed on the mobile handset utilizing functionality provided by a user side encryption module provided by the certificate authority, the digital server certificate having been issued to the application server by the certificate authority;

sharing encryption keys with the mobile handset using encryption provided by the user and server certificates if validation of both the mobile handset and the application server was successful; and encrypting data communicated to and from the mobile handset by means of the encryption keys.

A further feature of the invention provides for the sharing of the encryption keys to include sharing symmetric encryption keys.

The invention still further provides a method of enabling authentication of a communications channel between a mobile handset associated with a user and an application server and unique identification of the mobile handset by the application server, the method being carried out at a certificate authority and including the steps of receiving a request for a digital user certificate from the mobile handset, the request having been sent from a user side software application installed on the mobile handset;

issuing the user certificate to the mobile handset, the user certificate including at least one identifier uniquely associated with the mobile handset and by means of which the mobile handset may be uniquely identified;

issuing a digital server certificate to the application server;

including a digital signature in both the user certificate and the server certificate enabling the user side software application and the server side software application to exchange certificates and validate the respective certificates by using at least the digital signature and an encryption module provided by the certificate authority.

Further features of the invention provide for the method to include the steps of calculating a unique asymmetric key pair including a user public and private key; upon receiving the request, securing a communication channel with the mobile handset by means of a Diffie-Hellman or similar key exchange; transmitting at least the user private key to the mobile handset over the secure communication channel; including the user public key in the user certificate; and periodically re-issuing a new digital user certificate, possibly including a new user private and public key pair, to the mobile handset and/or application server.

BRIEF DESCRIPTION OF THE DRAWINGS

The invention will now be described by way of example only and with reference to the accompanying drawings. In the drawings:—

DETAILED DESCRIPTION WITH REFERENCE TO THE DRAWINGS

Figure 1:
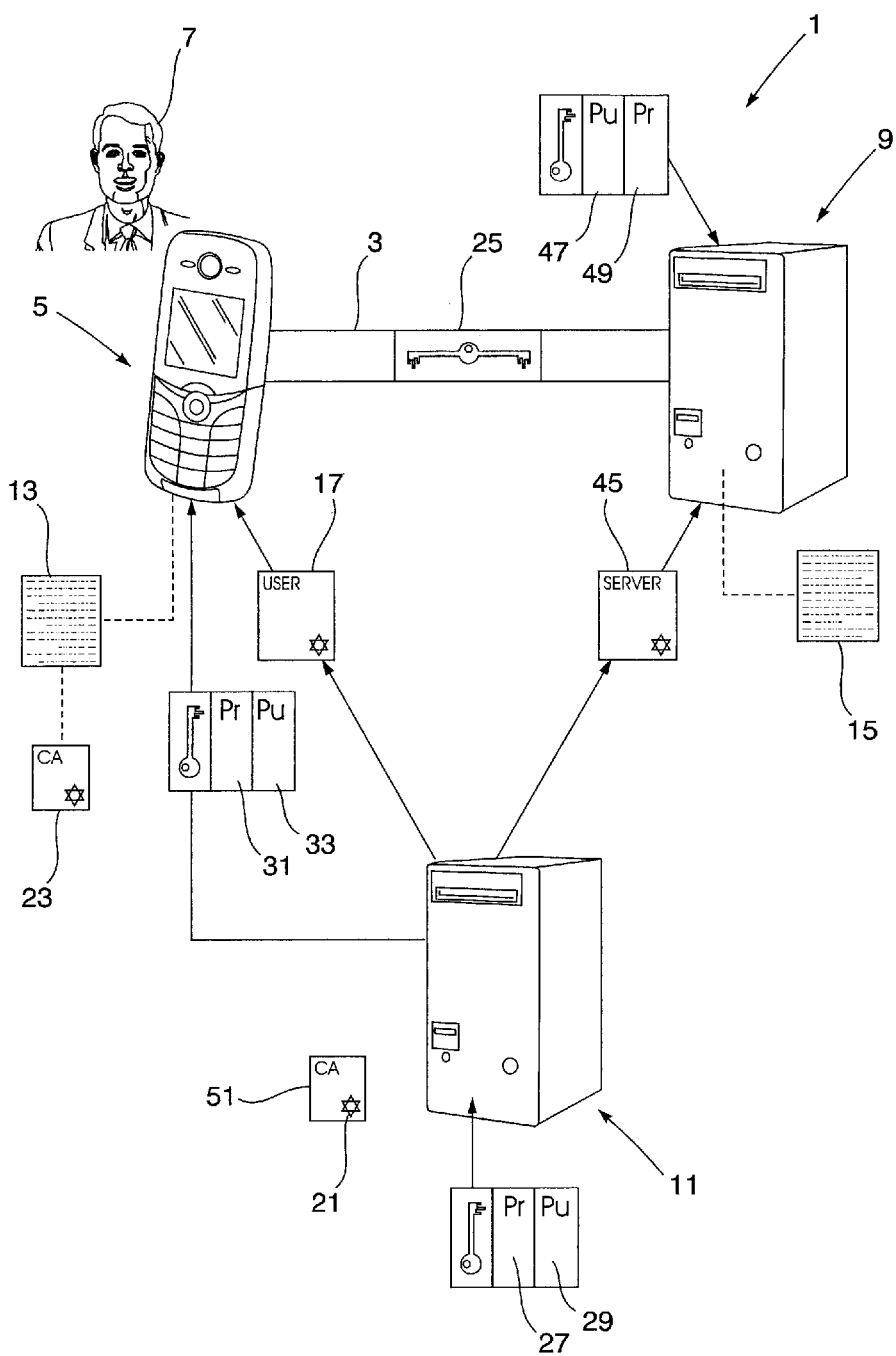
FIG. 1 is a schematic illustration of an authentication system in accordance with the invention.

A system (1) for authenticating a communications channel (3) between a mobile handset (5), in this example a mobile phone, associated with a user (7) and an application server (9) is shown in FIG. 1. The system (1) includes a certificate authority (11), as well as a user side software application (13) installed on the mobile phone (5), and a server side software application (15) installed on the application server (9). In addition, the mobile phone (5) and application server (9) each include an encryption module (not shown) provided by the certificate authority (11) which provides encryption functionality to the user and server side applications (13, 15). It should be apparent that the encryption modules may be compiled as part of the server and user side software applications, respectively. Where in the remainder of this description reference is made to functionality of either the server side or user side software applications it will be appreciated that such functionality may in effect be provided by the server side or user side encryption modules or vice versa.

The first time the user side software application requires encryption or unique user identification, it established that there is no digital user certificate (17) currently installed on the mobile phone (5). At this point, the application automatically connects to an online server of the certificate authority (11) ("CA") and attempts to request a digital user certificate (17) from the server (11). The user side application (13) firstly validates that the server it is communicating with is indeed that of the CA (11), and not a rogue server. This is done by validating a CA certificate signature (21) sent to the mobile phone (5) by the CA (11), against a CA certificate (23) that comes distributed as part of the user side software application (13) or encryption module. It should, however, be apparent that validation of the CA could be inherent if the user side software application is capable of decrypting communication from the CA that has been encrypted with a CA private key. If the user side software application is capable of decrypting the CA encrypted CA communication by using the CA public key it follows that the CA is who it purports to be.

Upon successful validation of the CA server (11), the CA creates and issues a digital user certificate (17) to the mobile phone. The user certificate (17) is a signed X.509 digital certificate that can be used to firstly identify the mobile handset (5) on which the certificate is installed and also for sharing symmetrical encryption keys (25) with the application server (9). The symmetrical encryption keys may, in turn, be used for data encryption between the handset (5) and the application server (9). This feature will be elaborated on in more detail below. The certificate (17) is signed with a private key (27) associated with the CA (11), a corresponding public key (29) of the CA (11) being known to both the user side and server side software applications or encryption modules, as the case may be, enabling them to decrypt the signature and verify that it was signed by the CA private key (27) and is accordingly authentic.

When issuing the handset (5) with the signed digital user certificate (17), the server (11) calculates a user private (31) and public (33) cryptographic key pair on behalf of the handset (5). This will mainly happen in cases where the handset (5) itself does not have enough processing power to calculate the key pair itself. The server (11) then attempts to establish a secure communication channel between it and the handset (5) by means of a Diffie-Hellman (DH) key exchange or similar protocol. If the DH key exchange is successful it sends through the user private key (31) over the secure channel to the handset (5), where it is received by the user side software application (13). The associated user public key (33) may then be included in the user certificate (17) and transmitted to the handset (5) separately. On receipt of the user key pair, and certificate (17), the user side software application (13) stores them in an encrypted (sandboxed) portion of the handset's (5) memory from where only authorized applications, including the user side software application (13) and/or user side encryption module, will be able to access it. It should be appreciated that if the handset (5) has enough processing power, it can calculate the user key pair (31, 33) itself. In this case the user private key (31) does not have to be transmitted between the server (11) and the handset (5) and can remain concealed in the handset's memory. The user side software application (13) may then simply transmit the user public key (33) to the application server (11) along with the request for the digital user certificate (17). The server (11) will then include the user public key (33) in the certificate (17) and sign it with its own private key (27) as before.

Figure 2:
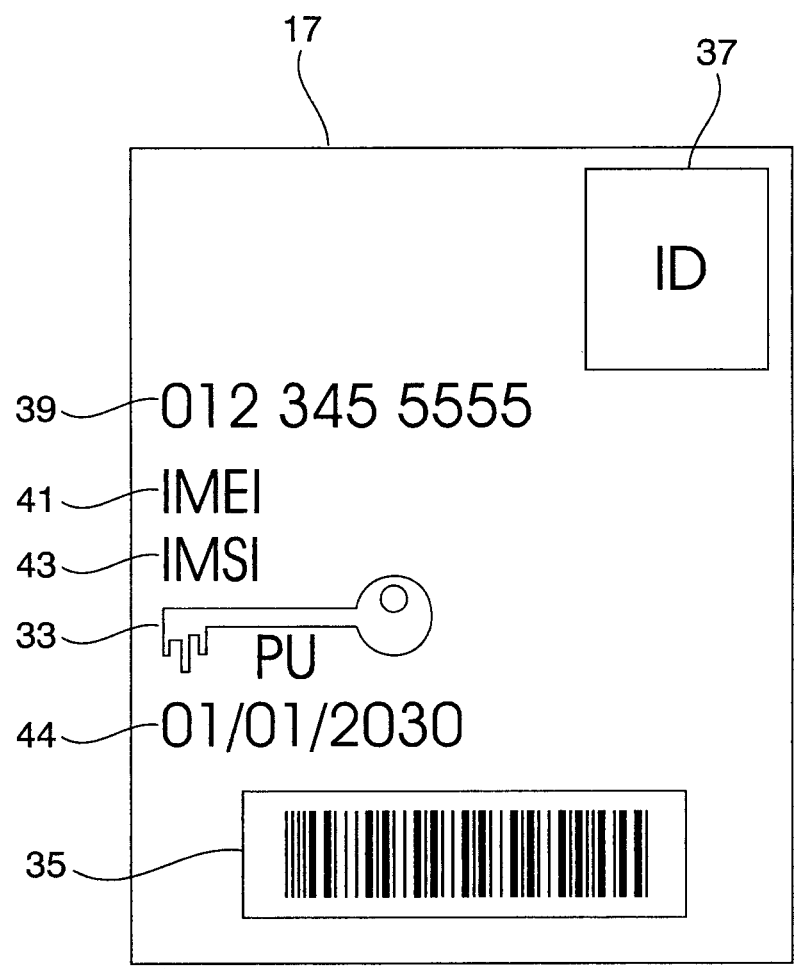
FIG. 2 is a schematic layout of a digital certificate in accordance with the invention.

A typical layout of a digital user certificate (17) is shown in FIG. 2. In addition to the user public key (33) and the CA signature (35), the certificate also contains an identifier (37) which is uniquely associated with the mobile handset (5). The identifier (37) may be any unique key which is issued by the CA. In the current embodiment of the invention, the identifier (37) is a sequential number generated by the CA (11). It should be appreciated that due to the sequential nature of the identifier (37), a one to one relationship exists between each certificate issued by the CA (11) and a mobile handset. In addition to the above, the certificate (17) may also include other information such as, for example, a mobile phone number (39) associated with the SIM card of the handset (5), the handset's IMEI (41) and/or IMSI (43) numbers as well as a certificate expiry date (44).

It should be appreciated that in the above described example issuing and storing of the user certificate (17) may happen completely in the background and automatically, without requiring any user intervention. Once the digital user certificate (17) has been issued by the CA (11) and stored in the secure location in the mobile handset (5), it may be used by the user side software application (13) and/or encryption module to identify the handset (5), to authenticate communication channels between the handset (5) and application servers (9) and to encrypt communications between the handset (5) and application server (9).

The application server (9) is also issued with a digital server certificate (45) by the CA (11). The issuing of the server certificate (45) may happen at any time, but normally upon request from the application server (9). This request will also come directly from the server side software application (15) or server side encryption module, typically when the application (15) is first installed on the application server (9). The format of the server certificate (45) is similar to that of the user certificate (17) described with reference to FIG. 2 and includes its own server public key (47). A corresponding server private key (49) is saved in a secure location in the server (9), from where it is only accessible by the server (9). Unlike is the case with the user key pair (31, 33), the server key pair (47, 49) is typically calculated by the server (9) itself, which generally has enough processing power to do so. The server (9) will therefore send its public key (47) to the CA (11) when requesting the server certificate (45) and the CA (11), in turn, will issue the server certificate (45), including the server public key (47), and sign it with its private key (27).

If both the handset (5) and application server (9) have been issued with digital certificates, the certificates (17, 45) may be used to authenticate communication channels between them, to identify the handset and/or application server and also to encrypt communication between them. Each time the mobile handset (5) connects to an application server (9), it will start a certificate exchange process, whereby its certificate (17) is sent to the server (9), and the server's certificate (45) is sent to the handset (5). Both parties will then validate the content of the received certificates (17, 45), and the digital signature, to make sure that the details in the certificates (17, 45) was not tampered with. This validation is done by using a CA digital certificate (51) that is part of both the user side application (13) and server side application (15) or their respective encryption modules. Knowledge of the CA public key (29) may, however, be sufficient to enable validation of the respective certificates to be conducted. It should be appreciated that the CA digital certificate (51) will include the CA public key (29) and that the user and server side applications will therefore use the CA public key (29) to decrypt the signed certificates (17, 45). If the certificates are not capable of being decrypted with the CA public key (29), it will be apparent that they were not signed with the CA private key (27), and are accordingly not authentic.

At this point, both parties can be sure they are talking to the intended recipients. The handset (5) and server (9) can now share encryption keys (25) by means of which further encrypting of their communications may be done. The shared encryption keys (25) are typically symmetrical encryption keys. It should be appreciated that, after the certificate exchange, the handset (5) will be in possession of the application server public key (47) and the application server (9) will be in possession of the handset public key (33). The encryption keys may therefore be encrypted by the handset using the server public key (47), and by the server using the handset public key (33), thus ensuring that only the receiving parties will be able to decrypt the communications using their respective private keys (31, 49).

The handset identifier (37) included in the user certificate (17) may also be used by the application server (9) to uniquely identify the handset (5) and, accordingly, the user (7). The application server may have a database of all the identifiers issued by the CA (11) to application server clients, and may choose to only communicate with handsets included in the database. The identifiers (37) may also be linked by the application server (9) to other information relating to the user (7). When the application server (9) therefore receives a user certificate (17) from the handset (5), it can firstly validate that the certificate is authentic and has been issued by the CA (11), and secondly that the handset (5) is indeed associated with a registered user. The digital user certificate (17) is therefore used not only to authenticate the communication channel (3) between the handset (5) and the application server (9), but also to uniquely identify the handset (5) that is attempting to transact with the application server (9). In this way, the application server (9) may rely on communications received from the handset and be confident that communication over the communication channel (3) is secure.

It should be appreciated that the user side software application may also validate that the application server is the rightful owner of the certificate it sent, simply by virtue of the fact that the user side software application is capable of decrypting communication sent to it by the application server and that has been encrypted by the application server private key. Only communications encrypted with the application server private key will be capable of being decrypted with the application server public key.

In an alternative embodiment of the invention, the mobile handset and application server may include additional, bespoke, software modules distributed by the owner of the application server. In this embodiment, the bespoke software modules will communicate with the user side and server side software applications and/or user and server side encryption modules in order to invoke the functionality of the invention.

It is foreseeable that the CA may periodically issue new certificates to all the handsets and/or application servers to which it has previously issued certificates. This may be done as frequently as required, but preferably on an annual basis. The issuing of new user certificates may then also include the calculation and issuing of new user private/public key pairs in cases where the CA calculated these on behalf of the mobile handset.

It is also foreseeable that the system will be capable of issuing certificates that include keys with increasingly larger bit sizes. At the time of writing, the industry standard for public and private keys is 1024 bits. The system may, however, easily be adapted to issue key pairs of 2048, 3072 and more bits.

The very first time the CA receives a request for a user certificate from a new handset, it will be appreciated that the CA may issue such a handset with a self-signed certificate. The CA may then communicate the request for the certificate, along with the purported identity of the new handset to the application server which, in turn, may decide whether a legitimate user certificate may be issued to the handset. If the application server decides that the handset should be issued with a legitimate user certificate it will communicate this decision to the CA who, in turn, will issue a, legitimate, fully signed user certificate to the handset, as described previously. In this way, the application server may keep record of the identities and number of legitimate certificates issued to its users by the CA.

The above description is by way of example only and it will be appreciated that numerous modifications may be made to the embodiments described without departing from the scope of the invention. In particular, the system architecture and data flow as described may be conducted in any number of different ways and in any workable order.

The system and method of the invention provides a way of authenticating a communication channel between a mobile handset, in particular a cellular phone, and an online application server, as well as a way of uniquely identifying the transacting handset and encrypting further communications between the application server and the handset.

The invention therefore provides a secure way of transacting from mobile phones with online application servers, thus making it possible and safe for service providers, such as banks, to allow the use of the full functionality of their online services from mobile phones and other mobile handsets.

The system of the invention may also be used on other mobile communications devices such as laptops. With standard SSL technology used in the majority of cases, the user's laptop is typically not issued with its own digital certificate. There is therefore typically no confirmation from the user side that the transacting user is in fact who he or she purports to be.

The invention therefore provides a stronger form of authentication and more secure communication than is provided by currently available systems. The encryption module provided by the CA in accordance with the invention, enables currently available software applications to utilize the invention.

The invention claimed is:

1. A system for authenticating a communications channel between a mobile handset associated with a user and an application server, for uniquely identifying the mobile handset and for encrypting communications between the mobile handset and the application server over the communication channel, the system including a certificate authority, a user side software application installed on the mobile handset, and a server side software application installed on the application server, wherein, the user side software application utilizes a user side encryption module provided by the certificate authority and is configured to automatically request a digital user certificate from the certificate authority;

the certificate authority is adapted to create and issue the user certificate to the mobile handset upon receiving the request and to calculate a user private and public key pair on behalf of the mobile handset if the mobile handset does not have enough processing power to do so itself, the user certificate including at least one identifier which is uniquely associated with the mobile handset and the user public key;

the server side software application utilizes a server side encryption module provided by the certificate authority and is configured to request and receive the user certificate from the mobile handset, to validate it as originating from the certificate authority using the server side encryption module, to uniquely identify the mobile handset from the identifier in the user certificate, and to transmit a digital server certificate issued to it by the certificate authority to the mobile handset where it is received by the user side software application and validated as originating from the certificate authority using the user side encryption module; and upon successful validation of the user certificate by the server side software application and of the server certificate by the user side software application, the user side software application and the server side software application are further configured to share encryption keys utilizing their respective certificates to provide encryption, the encryption keys being useful for further data encryption between the mobile handset and the application server.

2. The system as claimed in claim 1, wherein the user side software application automatically requests the digital user certificate from the certificate authority when the mobile handset attempts to transact with the application server for the first time.

3. The system as claimed in claim 1, wherein the user side software application and the server side software application are further configured to share encryption keys utilizing public and private key pairs associated with their respective certificates.

4. The system as claimed in claim 1, wherein the identifier is a unique digital key issued and assigned to the mobile handset by the certificate authority.

5. The system as claimed in claim 1, wherein the server certificate includes a server identifier uniquely associated with the application server and by means of which the mobile handset may uniquely identify the application server.

6. The system as claimed in claim 1, wherein the user and server certificates include a certificate authority signature generated with a certificate authority private key, a corresponding certificate authority public key by means of which the signature may be verified being known to both the user side and server side encryption modules and/or software applications.

7. The system as claimed in claim 1, wherein the certificate authority is further configured to, when calculating the user private and public key pair on behalf of the mobile handset, transmit at least the user private key to the mobile handset over a secure communications channel established between the certificate authority and mobile handset by means of a suitable key exchange protocol.

8. The system as claimed in claim 1, wherein the certificate authority includes the user public key in the user certificate and the server public key in the server certificate.

9. The system as claimed in claim 1, wherein the user side software application or encryption module is further configured to instruct the mobile handset to calculate the user private and public cryptographic key pair itself.

10. The system as claimed in claim 1, wherein the server side software application or encryption module is configured to instruct the application server to calculate a server private and public key pair.

11. The system as claimed in claim 1, wherein the user side software application or encryption module is further configured to instruct the mobile handset to store the received user certificate and user private and public key pair in a secure location in a mobile handset memory from where it may only be retrieved by authorized applications.

12. The system as claimed in claim 1, wherein the certificate authority periodically issues a new certificate to one or both of the mobile handset and the application server.

13. A method for authenticating a communications channel between a mobile handset associated with a user and an application server, for uniquely identifying the mobile handset, and for encrypting communications between the mobile handset and the application server over the communication channel, the method being exercised at the application server and including the steps of:

receiving a digital user certificate from the mobile handset by means of a server side software application installed on the application server and validating the certificate by utilizing functionality provided by an encryption module distributed by a certificate authority, the digital user certificate having been issued to the mobile handset by the certificate authority and including at least one identifier uniquely associated with the mobile handset and a user public key forming part of a user private and public key pair calculated by the certificate authority on behalf of the mobile handset if the mobile handset does not have enough processing power to do so itself;

transmitting a digital server certificate from the application server to the mobile handset for validation of the application server, validation of the application server being conducted by means of a user side software application installed on the mobile handset utilizing functionality provided by a user side encryption module provided by the certificate authority, the digital server certificate having been issued to the application server by the certificate authority;

sharing encryption keys with the mobile handset using encryption provided by the user and server certificates if validation of both the mobile handset and the application server was successful; and encrypting and decrypting data communicated to and from the mobile handset by means of the encryption keys.

\* \* \* \* \*